United States Patent [19]

Yamamoto et al.

[11] Patent Number: 5,170,206
[45] Date of Patent: * Dec. 8, 1992

[54] INDICATING APPARATUS WITHIN FINDER OF CAMERA

[75] Inventors: Masato Yamamoto; Toshimasa Yamanaka; Masahiro Nakajima, all of Tokyo, Japan

[73] Assignee: Asahi Kogaku Kogyo Kabushiki Kaisha, Tokyo, Japan

[*] Notice: The portion of the term of this patent subsequent to Dec. 11, 2007 has been disclaimed.

[21] Appl. No.: 591,877

[22] Filed: Oct. 2, 1990

Related U.S. Application Data

[63] Continuation of Ser. No. 287,135, Dec. 21, 1988.

[30] Foreign Application Priority Data

Dec. 25, 1987 [JP] Japan .................. 62-196988

[51] Int. Cl.$^5$ .................. G03B 17/18
[52] U.S. Cl. .................. 354/474; 354/471; 354/475
[58] Field of Search .............. 354/409, 465, 471, 472, 354/473, 474, 475

[56] References Cited

U.S. PATENT DOCUMENTS

| | | | |
|---|---|---|---|
| 3,436,158 | 4/1969 | Schmitt | 354/473 |
| 3,849,769 | 11/1974 | Chiba | 354/473 |
| 4,198,148 | 4/1980 | Tano . | |
| 4,239,360 | 12/1980 | Urano . | |
| 4,253,751 | 3/1981 | Tokutomi et al. | 354/409 |
| 4,560,264 | 12/1985 | Kitazawa et al. . | |
| 4,611,897 | 9/1986 | Hara et al. | 354/475 |
| 4,636,055 | 1/1987 | Alyfuku | 354/127.12 |
| 4,647,176 | 3/1987 | Shimizu et al. | 354/475 |
| 4,681,420 | 7/1987 | Suda et al. | 354/471 |
| 4,692,008 | 9/1987 | Arakawa et al. | 354/474 |
| 4,751,546 | 6/1988 | Yamamoto et al. | 354/475 |

FOREIGN PATENT DOCUMENTS

| | | | |
|---|---|---|---|
| 2625552 | 12/1976 | Fed. Rep. of Germany . | |
| 56-24331 | 3/1981 | Japan | 354/474 |
| 56-24332 | 3/1981 | Japan | 354/474 |
| 56-24333 | 3/1981 | Japan | 354/474 |

OTHER PUBLICATIONS

Olympus brochure, "Die Neue Autofocus–PERSPEKTIVE," OM 707, Olympus Optical Company (EUROPA) GmbH, Hamburg 80, May 1987.

Primary Examiner—Russell E. Adams
Attorney, Agent, or Firm—Sandler, Greenblum & Bernstein

[57] ABSTRACT

An apparatus for indicating photographing conditions within a finder of a camera, including at least one indicator which has a plurality of indicating elements and which represent a single symbol or figure as a whole in the finder field of view, each of the indicating elements indicating an associated photographing condition.

15 Claims, 3 Drawing Sheets

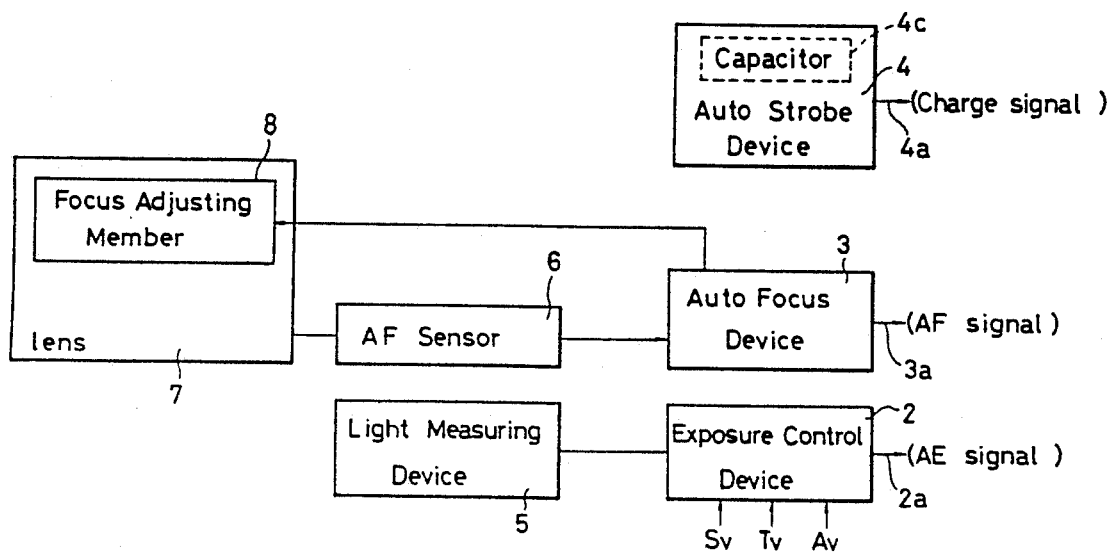
_Fig-1A_
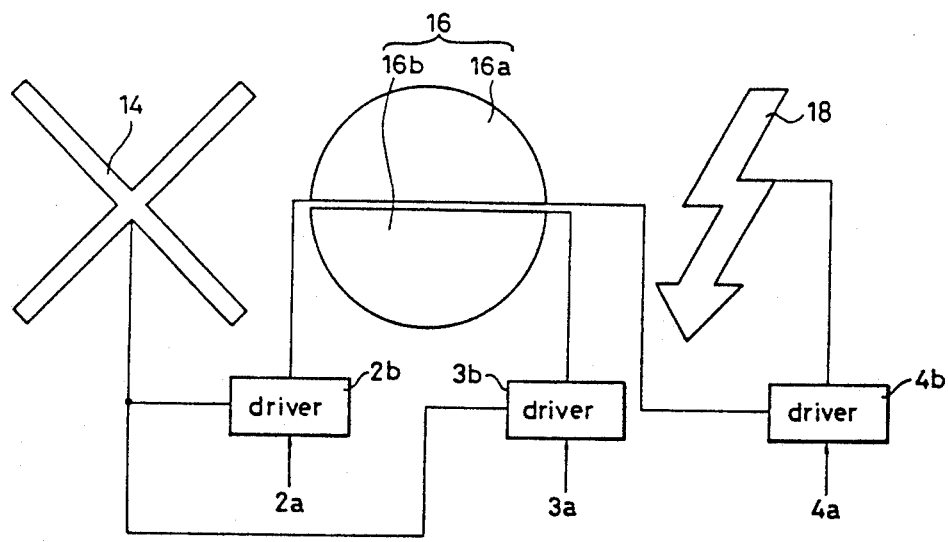
_Fig-1B_

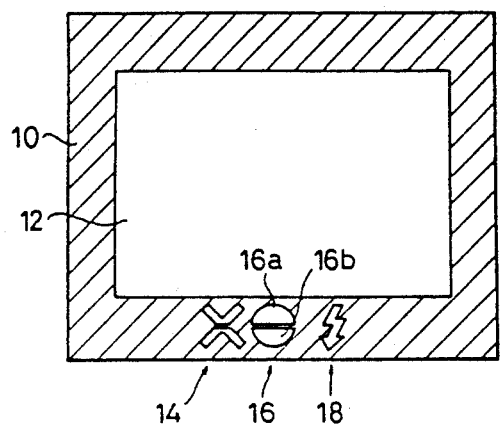
_Fig-2_
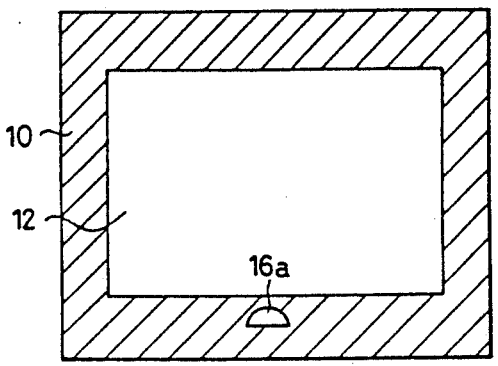
_Fig-3_
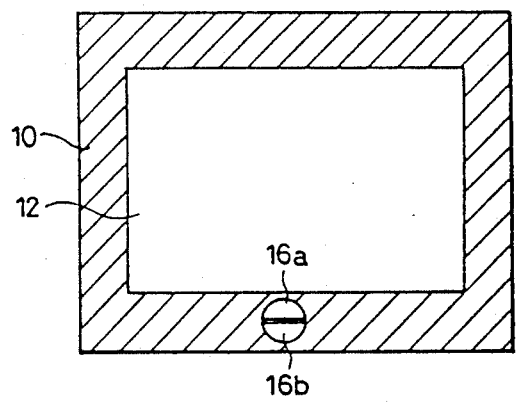
_Fig-4_
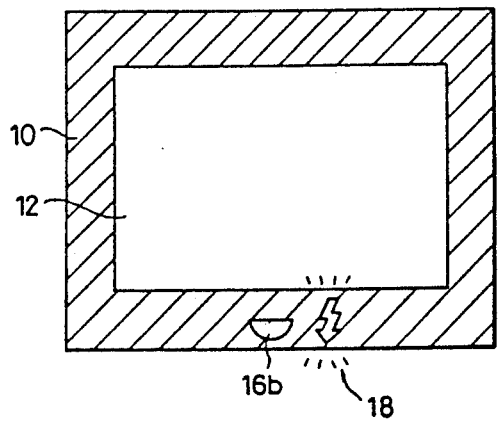
_Fig-5_

INDICATING APPARATUS WITHIN FINDER OF CAMERA

This is a continuation of application Ser. No. 07/287,135 filed Dec. 21, 1988.

BACKGROUND OF THE INVENTION

1. Field of the Invention

The present invention relates to an apparatus for indicating whether photographing conditions, such as exposure and focus etc. are proper or improper, within a finder of a camera.

2. Description of Related Art

There are known single-lens reflex cameras or lens shutter type cameras in which photographing information, such as exposure, focus conditions, or charging of strobe or the like are indicated within a finder. The photographing information usually indicates: (1) a shutter speed; (2) a diaphragm value; (3) whether or not an optimum exposure value detected by a light measuring device meets a preset exposure value; whether (4) or not a focus meets an object to be photographed; whether or not a strobe should be flashed; and (6) whether or not charging of the strobe is completed.

Usually, the exposure data is indicated by an exposure meter having a pointer; the focus data is indicated by a LED (Light Emitting Diode) which is activated in accordance with the focus conditions; and the strobe data is indicated by a LED which is activated in accordance with the state of charging, of the strobe.

However, these conventional indicating means are visually and organically independent from each other, so that they are selectively activated. The visibility of the indicating means depends on the location, size and color thereof, or a combination of colors of the indicating means.

SUMMARY OF THE INVENTION

The primary object of the present invention is to provide an indicating apparatus within a finder, comprising indicators which are functionally and/or visually associated with each other, so that a photographer can easily, quickly and intuitively learn the photographing conditions at a glance.

In a camera in which the exposure and focus, etc. can be automatically controlled it is not always necessary to indicate the values of exposure, focus, etc. In such a situation the information needed to be displayed is only whether or not the exposure and focus, etc. are correct or proper.

To achieve the object of the present invention, there is provided an indicating apparatus within a finder of a camera, comprising an indicator which has a plurality of indicating elements and which represents a single symbol or figure as a whole in the finder field of view. Each of the indicating elements represents photographing data, such as an exposure or focus or the like. In particular, the indicator exhibits a single symbol or figure to indicate whether the photographing conditions are proper or improper.

BRIEF DESCRIPTION OF DRAWINGS

The invention will be described below in detail with reference to the accompanying drawings, in which:

FIG. 1A is a block diagram of an indicating apparatus within a finder according to one aspect of a first embodiment of the invention;

FIG. 1B is a schematic diagram showing an indicator and a drive thereof actuated in accordance with signals of the apparatus shown in FIG. 1A;

FIGS. 2, 3, 4 and 5 are front elevational views of a finder field of view of a single-lens reflex camera to which the first embodiment is applied, shown in different operational positions;

DETAILED DESCRIPTION OF EMBODIMENTS

Figure 6:
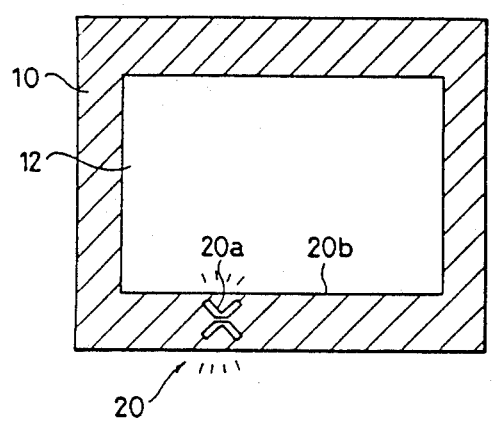
FIGS. 6, 7 and 8 are front elevational views of a finder field of view shown in different operational positions, according to a second embodiment of the present invention; and, FIG. 9 is a front elevational view of a finder field of view according to a second embodiment of the present invention.

A single-lens reflex camera 1 of the first embodiment has an exposure control device 2, an automatic focusing device 3, and an automatic strobe device 4, as shown in FIG. 1A. The exposure control device 2 emits a proper exposure signal (AE signal) 2a when the luminance of an object to be photographed, which is detected by a photometer or light measuring device 5, is within a control limit of the exposure control device 2, in case of a shutter-priority automatic photographing mode, an aperture-priority automatic photographing mode, or a program mode. On the other hand, in the case of a manual operating mode in which the shutter speed (TV) and the diaphragm value (AV) are manually set, the exposure control device 2 emits the AE signal 2a when the EV value (Exposure value), which is determined by the shutter speed and the diaphragm value, is within an allowable limit for the luminance of an object to be photographed. The automatic focusing device 3 moves a focus adjusting member 8 of a photographing lens 7 in accordance with the output of an AF sensor 6 and emits a focus signal (AF signal) 3a when the focus meets the object to be photographed. The automatic strobe device 4 detects the state of charging of a capacitor 4c and emits a charge completion signal (charge signal) 4a when the capacitor 4c is completely charged.

FIG. 2 shows an example of an indicator, in which three indicating elements 14, 16 and 18 are located side by side outside a frame 12 which defines the field of view of a focusing screen 10. Rays of light which are incident upon a photographing lens 7 and which are reflected by a quick return mirror (not shown) are collected in the field frame 12 to form an image of an object to be photographed, as is well known. These indicating elements 14, 16 and 18 are shown in an enlarged scale in FIG. 1B.

In the first embodiment the indicating element 14 has a light emitting diode (LED) and a generally X-shaped mask which represents an "impropriety", in front of the LED. The indicating element or improper photographing condition indicator 14 is lit (turned ON) when one of the photographing conditions, such the exposure or focus is improper. Drivers 2b and/or turn 3b the indicating element 14 ON when the AE signal 2a and/or AF signal 3a are not present.

The intermediate indicating element 16 has two semicircular LEDs which are opposed to exhibit a circlular configuration as a whole. The upper LED constitutes an exposure indicating portion 16a which indicates whether the exposure is proper or improper and the lower LED constitutes a focus indicating portion 16b which indicates whether the focus is proper or improper. At the correct exposure, the upper indicating portion 16a is illuminated (turned ON) in accordance with the AE signal 2a inputted in the driver 2b, and the lower indicating portion 16b is illuminated (turned ON) in accordance with the AF signal 3a inputted to the driver 3b to indicate a proper or correct focus.

When a release button (not shown) of a camera is pushed down half way (i.e., by a half stroke) so as to actuate the exposure control device 2 and the automatic focusing device 3, the exposure control device 2 selectively emits the AE signal 2a, in accordance with the associated photographing modes and the luminance of the object detected by the photometer 5. The automatic focus device 3 moves the automatic focus adjusting member 8, in accordance with the measurement of the AF sensor 6, to complete the focus adjustment.

During the operation mentioned above, the indicating element 14 is illuminated is the form of the "X" by the driver 2b until the AE signal 2a is issued. Similarly, the indicating element 14 is illuminated in the form of the "X" by the driver 3b until the AF signal 3a is issued. When one of the photographing conditions is improper, the indicating element 14 is lightened. When the indicating element 14 is illuminated, neither the upper indicating portion 16a nor the lower indicating portion 16b, of the intermediate indicating element 16 is illuminated.

When the proper exposure signal (AE signal) 2a is generated, the corresponding upper indicating portion 16a is lit by the driver 2b (FIG. 3). When the AF signal 3a is issued, the corresponding lower indicating portion 16b is lit by the driver 3b (FIG. 5). As a result, when both the AE signal 2a and the AF signal 3a are active, the upper and lower indicating portions 16a and 16b are lightened to form a illuminating circular figure (FIG. 4).

According to the present invention, "improper photographing conditions can be easily, quickly and intuitively grasped by looking at the figure or shape (semicircle or complete circle) of the indicating element 16 without logical thinking and without moving a photographer's eyes from the find. Generally, speaking, the figure "circle" represents "correct", "proper" or "normal", etc. and accordingly the figure of the indicating element 16 is useful for indicating the propriety of the photographing conditions.

Note that the indicating elements 14 and 16 are examples of the indicators of the exposure and the focus in the above-mentioned embodiment, and one of the indicating elements can be dispensed with.

The rightmost strobe indicating element 18 in FIGS. 1B and 2 comprises an LED which indicates the state of charging of the strobe 4. When an object to be photographed is dark enough to need the additional illumination of the strobe, 4 no AE signal 2a is output, and accordingly, the exposure indicating portion 16a is maintained inactive. Until the automatic strobe device 4 issues the charge completion signal 4a, the drive 4b (FIG. 5) causes the strobe indicating element 18 to flash on and off. When the charge completion signal 4a is issued, the strobe indicating element 18 is continuously turned ON by the driver 4b so as to indicate that the strobe is ready. It is possible to make the exposure indicating portion 16a turn ON by connecting the driver 4b to the exposure indicating portion 16a, as shown in FIG. 1B.

Figure 7:
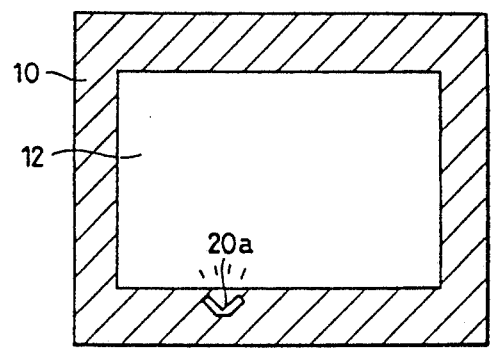
Figure 8:
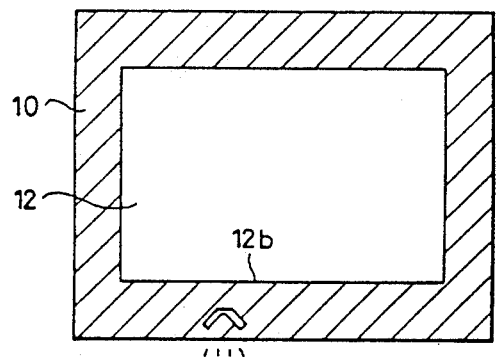

FIGS. 6 to 8 show a second embodiment of the present invention, in which the generally "X"-shaped indicating element 20 is divided into two halves, each including an independent LED. The upper half (generally V-shape) constitutes an improper exposure indicating portion 20a which flashes on and off when the exposure is improper, i.e., when no AE signal 2a is generated. The lower half (generally inverted V-shape) constitutes an improper focus indicating portion 20b which flashes on and off when the focus is improper or incorrect, i.e., when no AF signal 3a is issued.

According to this embodiment, when the release button is pressed half way (i.e., by a half stroke), the exposure control device 2 and the automatic focusing device 3 are activated. The upper exposure indicating portion 20a flashes on and off until the exposure condition becomes proper (FIG. 7), and the lower focus indicating portion 20b flashes on and off until the focusing is completed (FIG. 8). When both conditions (focus and exposure) are improper, the indicating portions 20a and 20b are lit (FIG. 6). When both the focus and exposure conditions become proper, the indicating portions 20a and 20b are turned OFF (extinguished).

With this arrangement, whether the photographing conditions are proper or improper can be easily, quickly and intuitively learned without moving the photographer's eye from the finder, similarly to the above-mentioned embodiment. The difference between the first embodiment mentioned above and the second embodiment, illustrated in FIGS. 6 to 8, is that proper photographing conditions are indicated in the first embodiment while improper photographing conditions are indicated in the second embodiment. It is possible to adopt both concepts in the same apparatus.

Figure 9:
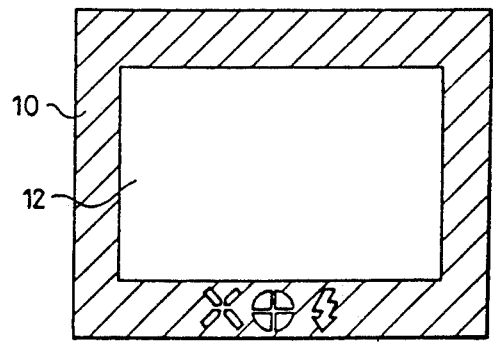

It is possible to divide the figure of the indicating element into more than two portions to indicate an increased number of photographing conditions as shown by a third embodiment, illustrated in FIG. 9. For example, the circular indicating element 16 can be divided into four portions, and the generally X-shaped indicating element 14 (or 20) can be divided into four portions at the legs of the letter "X". In summary, in the present invention, a figure, letter or mark, which is divided into several parts in accordance with the photographing conditions is completed in its shape or figure when desired photographing conditions are obtained. Figures or words can be used, such as, "OK", "○ (blank)", "PLEASE", "DO NOT", etc.

The colors of the indicating elements 14, 16, 18 and 20 are preferably red or the like when they indicate "no permission of photographing" and are blue or the like when they indicate "permission of photographing", from a psychological point of view. However, other colors can be used without diverting from the scope or spirit of the invention.

There is no limitation an the location of the indicating elements within the finder field of view. The indicating elements can be an LED, liquid crystal, or the like.

As can be seen from the foregoing, according to the present invention, since the indicators which indicate whether or not the photographing conditions (information), such as exposure or focus are proper, within the finder field of view are made of divided characters, letters, figures or the like, and since the divided parts thereof indicate the necessary information, a photographer can quickly, easily and intuitively learn the photographing conditions, such as exposure, focus, or a state of charging of the strobe, while looking at the object to be photographed through the finder without moving the photographer's eye from the finder.

We claim:

1. An apparatus for indicating photographing conditions, said apparatus comprising at least one indicator symbol formed as a composite of a plurality of individually controllable indicating elements, said indicator symbol representing a single symbol or figure as a whole in a field of view, a condition of a plurality of said photographing conditions being indicated by said indicator symbol.

2. The apparatus for indicating photographic conditions according to claim 1, wherein each individually controllable indicating element represents a different one of said photographic conditions.

3. An apparatus for indicating a plurality of photographing conditions, said apparatus comprising at least one indicator symbol formed as a composite of a plurality of complementary, individually controllable, indicating elements, said indicator symbol representing a single symbol or figure as a whole in the field of view, said plurality of photographing conditions being indicated simultaneously by said indicator symbol.

4. An indicating apparatus according to claim 3, wherein said indicator symbol has a substantially circular configuration which is divided into a plurality of parts.

5. An indicating apparatus according to claim 3, wherein said indicating elements comprise light emitting diodes.

6. An indicating apparatus according to claim 5, wherein said light emitting diodes are illuminated when said photographing conditions are proper.

7. An indicating apparatus according to claim 5, wherein an light emitting diode flashes on and off when a photographing condition represented by said indicating element is improper and said indicating element is turned off when said photographing condition becomes proper.

8. An indicating apparatus according to claim 3, wherein said indicator symbol is within the finder of a camera.

9. An indicating apparatus according to claim 3, wherein each of said indicating elements represents an independent camera condition.

10. An apparatus for indicating photographing conditions within a finder of a camera, comprising an indicator having a plurality of indicating elements which can be independently activated, said indicator representing a single symbol or figure as a whole in said finder field of view, said single symbol or figure as a whole indicating a plurality of said photographing conditions.

11. An apparatus for indicating a plurality of photographing conditions, comprising an indicator having a plurality of complementary indicating elements which can be independently activated, said indicator representing a single symbol or figure as a whole, said single symbol or figure as a whole indicating said plurality of photographing conditions simultaneously.

12. An indicating apparatus according to claim 11, wherein all indicating elements are illuminated when said photographing conditions are proper.

13. An indicating apparatus according to claim 11, wherein said indicator is within the finder of a camera.

14. An indicating apparatus according to claim 11, wherein each of said indicating elements represent an independent camera condition.

15. An indicating apparatus for a camera, comprising at least one indicator symbol formed as a composite of a plurality of individually controllable indicating elements, each of said indicating elements associated with a particular photographic condition, said indicator symbol representing a single symbol or figure as a whole, the condition of the plurality of photographic conditions being indicated by said indicator symbol.

* * * * *

UNITED STATES PATENT AND TRADEMARK OFFICE
CERTIFICATE OF CORRECTION

PATENT NO. : 5,170,206
DATED : December 8, 1992
INVENTOR(S) : M. YAMAMOTO et al.

It is certified that error appears in the above-indentified patent and that said Letters Patent is hereby corrected as shown below:

At column 5, line 6 (claim 1, line 7), insert --- simultaneously--- after "being".
At column 6, line 12 (claim 10, line 6), insert --- simultaneously--- after "whole".
At column 6, line 36 (claim 15, line 8), insert --- simultaneously--- after "being".

Signed and Sealed this

Ninth Day of August, 1994

BRUCE LEHMAN

Attest:

Attesting Officer

Commissioner of Patents and Trademarks